United States Patent
DeWall

(10) Patent No.: US 10,030,976 B2
(45) Date of Patent: Jul. 24, 2018

(54) PHASE-BASED MEASUREMENT AND CONTROL OF A GYROSCOPE

(71) Applicant: Kionix, Inc., Ithaca, NY (US)

(72) Inventor: Jonah DeWall, Ithaca, NY (US)

(73) Assignee: Kionix, Inc., Ithaca, NY (US)

( * ) Notice: Subject to any disclaimer, the term of this patent is extended or adjusted under 35 U.S.C. 154(b) by 229 days.

(21) Appl. No.: 14/710,991

(22) Filed: May 13, 2015

(65) Prior Publication Data
US 2016/0334213 A1  Nov. 17, 2016

(51) Int. Cl.
G01C 19/56 (2012.01)
G01C 19/5684 (2012.01)
G01C 19/5712 (2012.01)
G01C 19/5776 (2012.01)

(52) U.S. Cl.
CPC ..... G01C 19/5684 (2013.01); G01C 19/5712 (2013.01); G01C 19/5776 (2013.01)

(58) Field of Classification Search
CPC ............ G01C 19/5684; G01C 19/5712; G01C 19/5776
See application file for complete search history.

(56) References Cited

U.S. PATENT DOCUMENTS

| | | | | |
|---|---|---|---|---|
| 4,951,508 A * | 8/1990 | Loper, Jr. | ........... | G01C 19/5691 73/1.84 |
| 5,196,905 A * | 3/1993 | Hahn | ................... | G01C 19/661 356/467 |
| 5,197,331 A * | 3/1993 | Oikawa | .............. | G01C 19/5649 73/504.12 |
| 5,696,420 A * | 12/1997 | Inanaga | ............. | G01C 19/5649 310/316.01 |
| 6,053,044 A * | 4/2000 | Ohnishi | ............. | G01C 19/5607 73/504.12 |
| 6,198,355 B1 * | 3/2001 | Lindquist | ............. | H03D 13/004 327/12 |
| 6,255,760 B1 * | 7/2001 | Hasegawa | .......... | G01C 19/5607 310/316.01 |

(Continued)

FOREIGN PATENT DOCUMENTS

EP  1164353 A1  12/2001
EP  2647954 A2  10/2013

(Continued)

OTHER PUBLICATIONS

On Semiconductor (on Semiconductor: "Applications for the NE521/522," AND8176/D, 30th Nov. 2005, XP055295532, Retrieved from the Internet: Url: http://www.onsemi.com/pub_link/Collateral/AND8176-D.pdf [retrieved on Dec. 12, 2016]).*

(Continued)

*Primary Examiner* — Helen Kwok
(74) *Attorney, Agent, or Firm* — Sterne, Kessler, Goldstein & Fox P.L.L.C.

(57) ABSTRACT

A gyroscope includes a resonator, a transducer, and a comparator. The comparator is designed to receive an input signal from the transducer and compare the input signal with a reference signal to produce an output signal. Rising and falling edge transitions of the output signal are substantially synchronized with a motion of the resonator along a sense-axis of the transducer.

40 Claims, 8 Drawing Sheets

(56) References Cited

U.S. PATENT DOCUMENTS

| | | | |
|---|---|---|---|
| 6,486,743 B2* | 11/2002 | Hasegawa | G01C 19/5607 310/316.01 |
| 6,573,636 B1* | 6/2003 | Iino | H02N 2/166 310/316.01 |
| 6,597,083 B2* | 7/2003 | Gallmeyer | H01L 41/042 310/315 |
| 6,626,039 B1 | 9/2003 | Adams et al. | |
| 7,023,125 B2* | 4/2006 | Kuboi | H02N 2/06 310/317 |
| 7,275,433 B2 | 10/2007 | Caminada et al. | |
| 7,281,426 B1* | 10/2007 | Chikovani | G01C 19/5691 73/504.13 |
| 7,907,027 B2* | 3/2011 | Partridge | H03B 5/04 331/154 |
| 8,156,805 B2* | 4/2012 | Hayner | G01C 19/56 329/360 |
| 8,395,427 B1* | 3/2013 | Gao | H03L 7/091 327/147 |
| 8,884,710 B2* | 11/2014 | Shaeffer | G01C 19/5776 327/156 |
| 2001/0052824 A1* | 12/2001 | Hasegawa | G01C 19/5607 331/25 |
| 2006/0037417 A1* | 2/2006 | Shcheglov | G01C 19/5684 74/5.4 |
| 2008/0202237 A1* | 8/2008 | Hammerschmidt | G01C 19/5719 73/504.04 |
| 2008/0314144 A1* | 12/2008 | Blomqvist | G01C 19/5762 73/504.12 |
| 2011/0179868 A1* | 7/2011 | Kaino | G01C 19/5607 73/504.12 |
| 2011/0197674 A1* | 8/2011 | Prandi | G01C 19/5726 73/504.12 |
| 2012/0191398 A1* | 7/2012 | Murakami | G01C 19/5776 702/99 |
| 2013/0099836 A1* | 4/2013 | Shaeffer | G01C 19/5776 327/148 |
| 2013/0113533 A1* | 5/2013 | Aaltonen | H03L 1/02 327/147 |
| 2013/0120074 A1* | 5/2013 | Zuo | H03B 5/1243 331/116 FE |
| 2014/0000340 A1* | 1/2014 | Kim | G01C 19/5776 73/1.38 |
| 2014/0144230 A1* | 5/2014 | Magnoni | G01C 19/56 73/504.12 |

FOREIGN PATENT DOCUMENTS

| | | |
|---|---|---|
| WO | WO 2008/145823 A1 | 12/2008 |
| WO | WO 2014/072762 A1 | 5/2014 |

OTHER PUBLICATIONS

Abe, M., et al., "Trident-type tuning fork silicon gyroscope by the phase difference detection," Proc. 13th IEEE International Conference Microelectromechanical Systems, 2000; pp. 508-513.

Allen, P.E., et al., CMOS Analog Circuit Design, 2002, 2nd ed., New York, NY: Oxford.

An, S., et al., "Dual-axis microgyroscope with closed-loop detection," Sensors and Actuators, A., vol. 73, No. 1, 2002; pp. 1-6.

Dalal, M., et al., "Novel readout scheme for MEMS vibratory gyroscopes based on signal phase shift," Solid-State Sensors, Actuators and Microsystems Workshop, 2012; pp. 328-331.

Dong, Y., et al., "Microgyroscope control system using a high-order band-pass continuous-rime sigma-delta modulator," Sensors and Actuators, A., vol. 145, 2008; pp. 299-305.

John, J.D., et al., "Phase differential angular rate sensor—concept and analysis," IEEE Sensors Journal, vol. 4, No. 4, 2004; pp. 471-478.

Norouzpour-Shirazi, A., et al., "A digital phase demodulation technique for resonant MEMS gyroscopes," IEEE Sensors Journal, vol. 14, No. 9, 2014; p. 3260.

Ravazi, B., et al., Design of Analog CMOS Integrated Circuits, McGraw-Hill, 2000.

Sharma, A., et al., "A 104-dB dynamic range transimpedance-based CMOS ASIC for tuning fork microgyroscopes," IEEE Journal of Solid-State Circuits, vol. 42, No. 8, 2007; pp. 1790-1802.

Träff, H., "Novel approach to high speed CMOS current comparators," Electronics Letters, vol. 28, No. 3, 1992; pp. 310-311.

Yazdi, N., et al., "Micromachined intertial sensors," Proceedings of the IEEE, vol. 86, No. 8, 1998; pp. 1640-1659.

Yuan, F., CMOS Current-Mode Circuits for Data Communications, New York, NY: Springer, 2007.

* cited by examiner

| Signal | Positive Rate | Negative Rate |
|---|---|---|
| B3 | | |
| B1 | | |
| B2 | | |
| B1 ∪ B2 | | |
| D1 | | |
| D2 | | |
| D3 | | |

FIG. 5C

PHASE-BASED MEASUREMENT AND CONTROL OF A GYROSCOPE

BACKGROUND

Field

Embodiments of the invention relate to sensing and control schemes for a gyroscope based on signal phase.

Background

Microelectromechanical systems (MEMS) are miniature devices composed of one or more mechanical components coupled with an integrated circuit (IC). A MEMS gyroscope (or gyro) is a MEMS device that is designed to measure angular rate. For example, a sufficiently accurate gyro would be able to measure the rate of rotation of the earth (~15 deg/hr). MEMS gyros are becoming more and more ubiquitous in consumer electronics such as cell phones, tablets, cameras, etc. To be included in such applications, a gyro must adhere to stringent requirements regarding power consumption, physical size, and performance.

MEMS gyros typically contain a miniature mechanical resonator with multiple vibrational degrees-of-freedom called modes. A tri-axial MEMS gyro may contain one drive-mode and three sense-modes. In such a device, the drive-mode is driven into resonance at its characteristic frequency with a driving actuator, and the motion of three sense-modes, oriented in orthogonal directions such as roll, pitch, and heading, are measured with sensing transducers. When exposed to an externally applied angular rate, some of the oscillatory motion of the drive-mode causes one or more of the sense-modes to oscillate mechanically. Thus, angular rate can be determined through measurement of the motion of the sense-modes. An example providing the design of a MEMS gyroscope may be found in U.S. Pat. No. 6,626,039, the disclosure of which is incorporated by reference herein in its entirety.

The overall signal-to-noise (S/N) of a MEMS gyro is largely dictated by the dynamic range and noise characteristics of the analog front-end (AFE) circuitry. In general, decreasing the AFE noise requires increased power consumption. Thus, MEMS gyros usually exhibit a trade-off between power consumption and performance. A MEMS gyro AFE typically consists of an amplifier front-end with a high-impedance feedback network, providing high gain. Resistive feedback networks provide simple passive networks, but suffer from thermal noise. Switched-capacitor networks must be actively reset and suffer from noise folding effects similar in magnitude to resistor thermal noise. Regardless of the feedback network of choice, the output is at best limited to the supply voltage rails of the amplifier (Vss, Vdd), ultimately limiting the achievable dynamic range.

BRIEF SUMMARY

In the embodiments presented herein, various sensing and control schemes of a gyroscope are described. The sensing and control schemes may be implemented using analog front end (AFE) and feedback control circuitry. The measurement and control schemes presented herein avoid the usual tradeoff between power consumption and performance, enabling both low power and low noise operation. This is achieved with phase-based AFE circuitry, operating at low power, low noise, and small size; and phase-based closed-loop operation that substantially increases the S/N.

In an embodiment, a gyroscope includes a resonator, a transducer, and a comparator. The comparator is designed to receive an input signal from the transducer and compare the input signal with a reference signal to produce an output signal. Rising and falling edge transitions of the output signal are substantially synchronized with a motion of the resonator along a sense-axis of the transducer.

In another embodiment, a gyroscope includes an actuator, a transducer, a comparator, and a drive module. The comparator receives an input signal from the transducer and compares the input signal with a reference signal to produce an output signal. The driver module receives the output signal and produces a driving signal that is applied to the actuator.

In another embodiment, a gyroscope includes a resonator, phase detection and feedback control circuitry, and exhibits phase shifts in response to externally applied angular rate. Feedback signals are applied to the resonator to counteract the phase shifts, maintaining a constant (or zero) phase. The magnitude of the feedback required to counteract the phase shifts provides a measurement of externally applied angular rate.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIG. 5C illustrates example waveforms for the examples in FIGS. 5A-5B, according to an embodiment.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Figure 1:
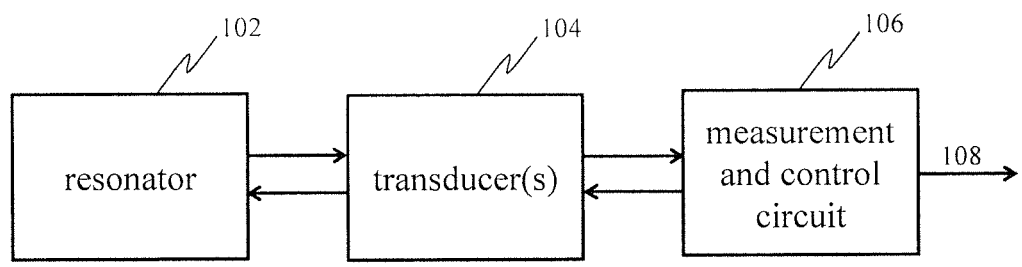
FIG. 1 illustrates a block diagram of a resonator system, according to an embodiment.

FIG. 1 illustrates an example gyroscope system 100, according to an embodiment. Gyroscope system 100 includes a resonator 102, at least one transducer 104, and a circuit 106 that interfaces with transducer 104. Transducer 104 represents one or more transducers. Resonator 102 may be a MEMS resonator, such as, for example, a microfabricated tuning-fork, bulk acoustic wave (BAW) resonator, surface acoustic wave (SAW) resonator, or some other type of resonator. Here, a multi-degree-of-freedom MEMS gyro resonator is used to identify the resonator, but it should be understood that other resonator structures may be used as well.

Transducer 104 may be any component capable of transforming one form of energy to another form of energy. For example, transducer 104 may produce an electrical signal proportional to a mechanical motion. Such a transducer may be known as a sensor. In another example, transducer 104 may produce a force proportional to a received electrical signal. Such a transducer may be known as an actuator. A typical gyroscope includes one or more driving actuators along with multiple sensing transducers oriented in orthogonal directions to measure roll, pitch, and heading. Typically, two driving actuators are oriented in opposite directions along the drive-mode axis, and two sensing transducers are oriented in opposite directions along each sense-mode axis. Transducer 104 may be considered an integral part of resonator 102, or it may be considered a component of circuit 106.

Circuit 106 may be front-end circuitry that interacts directly with transducer 104. According to an embodiment, circuit 106 includes a comparator to detect motion of resonator 102 along a sense-axis of transducer 104. Circuit 106 may include all analog components, a mixture of analog and digital components, or all digital components using an analog-to-digital converter. In an example where resonator 102 is a MEMS resonator, circuit 106 may be monolithically integrated in the same semiconductor substrate used to fabricate resonator 102. Maximizing a signal-to-noise ratio of circuit 106 results in better performance of the overall resonator system 100. Various embodiments of circuit 106 are described further herein. An output 108 of circuit 106 may be received by one or more additional circuits. In one example, output 108 may be fed back to resonator 102 for controlling an actuator of resonator 102 to provide closed-loop feedback.

In the case of a gyro resonator, the motion detected by sense-axis transducers is not necessarily confined to the motion of a single mode. Quadrature arises due to the fact that sense-axis transducers usually measure a component of the drive-mode, whether it is intended or not. In order to achieve and maintain oscillatory drive-mode motion and to convert oscillatory sense-mode signals into usable output, some gyros may use a system known as a phase-locked-loop (PLL). The PLL synchronizes a high-frequency oscillator (or equivalent) to drive-mode motion. The synchronized clock provides a time basis for the generation of drive-mode stimuli as well as the demodulation of the oscillatory sense-mode outputs. The purpose of the demodulation is to remove quadrature and provide an output signal proportional to angular rate in the frequency band of interest (for example, less than 1 kHz). However, any asynchronization of the oscillator with respect to the mechanical resonator can result in significant errors in the final output.

According to an embodiment, a phase-based gyro architecture does not rely upon a PLL or a high-frequency synchronized oscillator. Instead, the mechanical resonator provides its own time basis for both drive and sense systems, and any oscillators required to provide a time basis for the electrical system can be asynchronous with the motion of the mechanical resonator.

To take full advantage of the phase-based approach, comparator front-end (CFE) circuitry may be used in lieu of traditional circuitry that usually consists of an amplifier with very high gain, according to an embodiment. This is possible since only phase information, not amplitude, is required in the critical signal path. A comparator is a circuit that produces a mixed-signal waveform (MSW) by comparing an input signal against a reference. The output is high when the input signal is larger than the reference signal (or vice versa), and the output is low when the input signal is smaller than the reference signal (or vice versa). Thus, comparators differ from amplifiers in that they are designed to operate in saturation where the output is the high or low rail (Vdd or Vss). Also, the lack of a feedback loop reduces noise and simplifies the circuitry. Furthermore, since phase is used in lieu of amplitude information, the dynamic range of the CFE (measured in phase) can be made much higher than that of traditional circuits which measure amplitude.

Figure 2A:
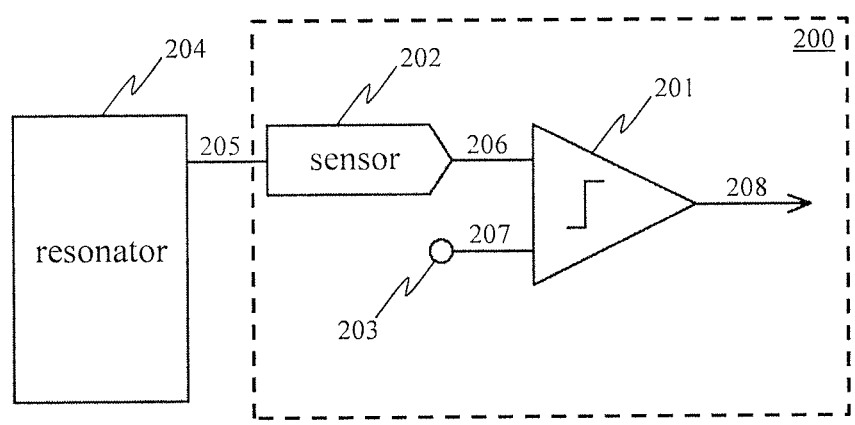
FIGS. 2A-2E illustrate phase-based gyroscope measurement schemes using one or more comparators, according to some embodiments.

FIG. 2A illustrates an example resonator 204 coupled to a circuit 200, according to an embodiment. Note that in this figure, and the proceeding figures, a transducer is considered a component of the circuit. However, the transducer may also be considered a component of resonator 204.

Resonator 204 may be an element of a gyroscope system. In an embodiment, resonator 204 is a MEMS resonator. Circuit 200 includes a comparator 201 and a transducer 202. Transducer 202 may be used to convert a mechanical signal 205 associated with resonator 204 to an electrical signal 206 received by comparator 201.

In an embodiment, transducer 202 is aligned along a sensing axis of resonator 204 and is oriented to detect the motion (displacement or velocity) of one or more modes of resonator 204. Comparator 201 compares the received electrical signal 206 to a reference signal 207 (current or voltage) produced by a reference source 203. Reference source 203 may be a current or voltage source. Comparator 201 produces an output signal 208 having transitions (rising and falling edges) that are synchronized to the motion of the resonator 204 along the sense-axis of transducer 202. In one example, output signal 208 is a mixed signal waveform (MSW). As such, output signal 208 may be considered digital in amplitude and analog in time.

Reference source 203 may be chosen such that reference signal 207 shares common-mode errors with input signal 206. In this scenario, the errors may be substantially eliminated from output signal 208 resulting from the cancellation during the comparison operation. Common-mode errors typically cancelled in this way include voltage supply noise or other correlated errors such as variations over temperature.

Figure 2B:
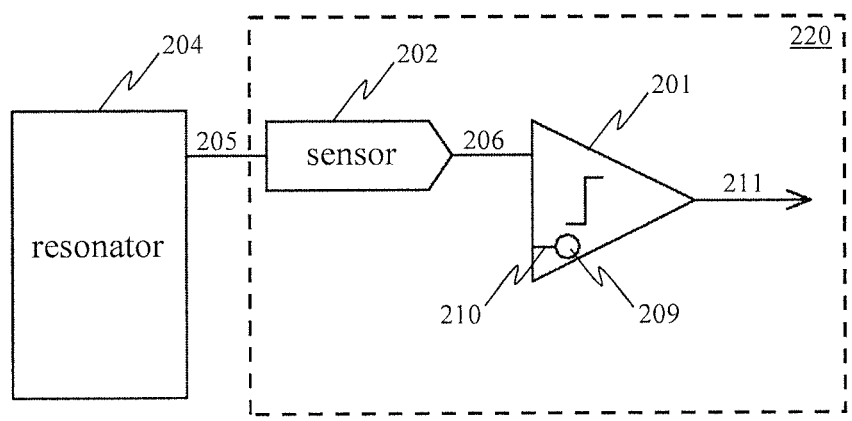

FIG. 2B illustrates resonator 204 coupled with another circuit 220, according to an embodiment. Circuit 220 includes a single-ended comparator 201, which accepts a single input signal 206. Reference source 209 and reference signal 210 are internal to comparator 201. For example, reference source 209 could be an internal voltage bias (for voltage-mode comparators) or a quiescent current in the first leg of a current-mode comparator such as that described in H. Träff, "Novel approach to high speed CMOS current comparators" *Electronics Letters* 28.3, (1992), pp. 310-311.

Comparator 201 produces an output signal 211 based on a current or voltage level of input signal 206 compared to reference signal 210.

Figure 2C:
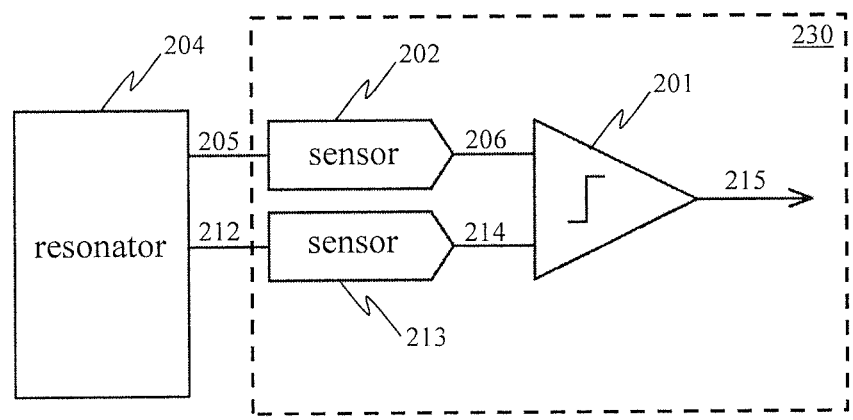

FIG. 2C illustrates resonator 204 coupled with another circuit 230, according to an embodiment. Rather than receiving a reference voltage from some external source, comparator 201 is coupled to a differential pair of transducers 202 and 213, and has the advantage of cancelling common-mode errors shared by the transducers while nominally doubling the signal. Each of transducers 202 and 213 may be aligned along a different axis of resonator 204. In such a configuration, transducer 202 supplies input signal 206 while transducer 213 provides a reference signal 214. In one example, transducers 202 and 213 sense motion about nominally anti-parallel sense axes. Comparator 201 produces an output signal 215 based on a current or voltage level of input signal 206 compared to reference signal 214.

In one example, orienting the sense-axis of transducer 202 to the drive-mode of resonator 204 produces a MSW synchronized with the drive motion. This drive-synchronized signal can be utilized for a number of synchronization/triggering purposes in the system, essentially serving the purpose of a system clock. In another example, orienting the sense-axis of transducer 202 to a sense-mode of resonator 204 produces a MSW synchronized with the sense motion. This sense-synchronized signal may become phase shifted with respect to the drive-synchronized signal or another sense-synchronized signal due to externally applied angular rate. The induced phase shift is proportional to the applied angular rate and it is used to produce the final gyroscope output.

Figure 2D:
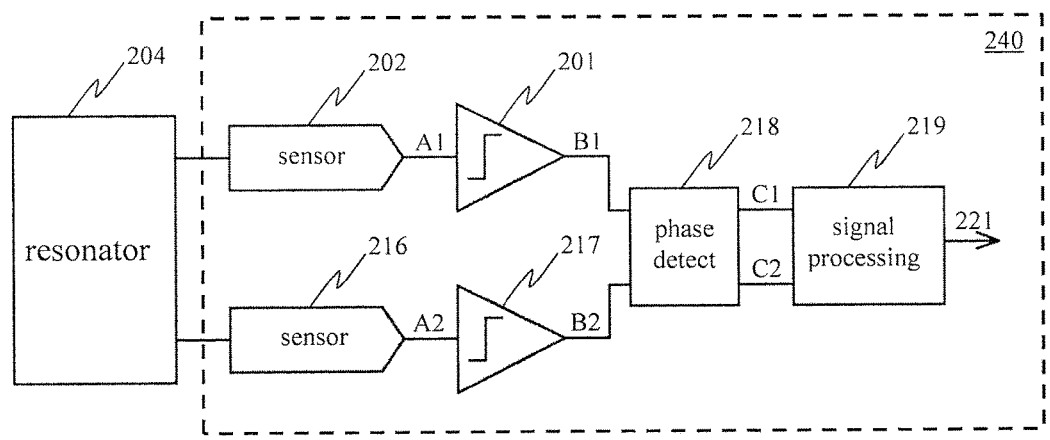
Figure 2E:
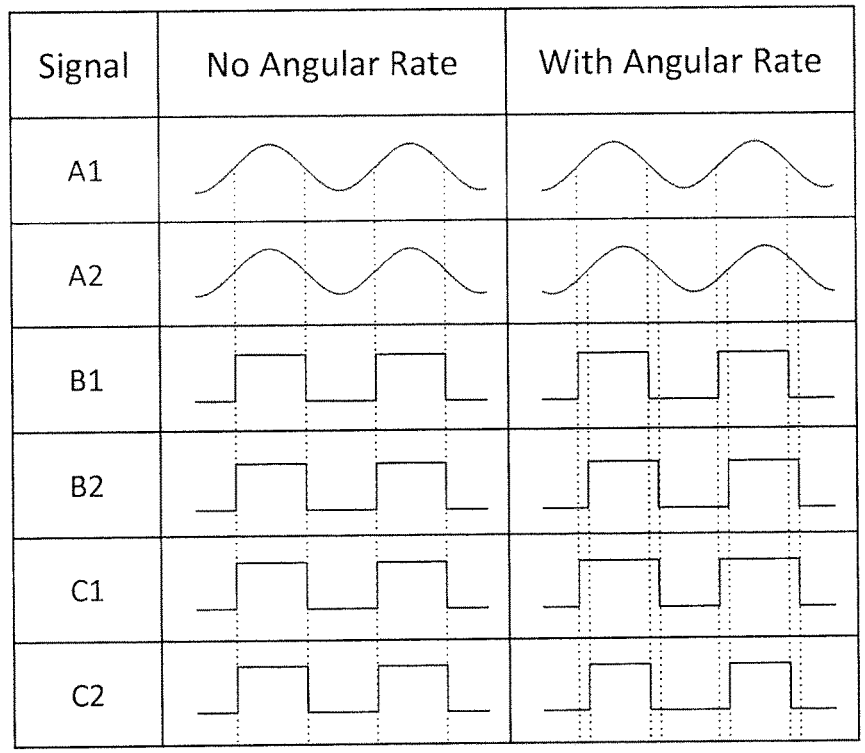

FIG. 2D illustrates resonator 204 coupled with another circuit 240, according to an embodiment. In this example, circuit 240 includes two sensing transducers 202 and 216, and two comparators 201 and 217 (shown as, but not necessarily, single-ended). The comparator outputs are fed to a phase detect circuit 218, which produces output signals (C1 and C2) whose pulse widths are proportional to phase shifts between the first and second comparator outputs (B1 and B2). FIG. 2E depicts the relationship between various signals within circuit 240. In an embodiment depicted by FIG. 2E, the phase detect circuit 218 generates complementary pulse-width modulated (PWM) signals C1 and C2 such that the pulse widths of C1 are proportional to the phase between B1 and B2, and the pulse widths of C2 are proportional to the phase between B2 and B1. In this way, the complementary signals C1 and C2 provide a basis for differential measurement, according to an embodiment.

According to an embodiment, circuit 240 includes a signal processing module 219. Signal processing module 219 may be used to receive the phase detect signals, perform signal processing operations on them, such as gain and/or filtering operations, and produce a low-frequency (e.g., <1 kHz) output signal proportional to the applied angular rate.

In one example, sensing-transducer 202 is aligned with a sense-axis of resonator 204 and sensing-transducer 216 is aligned with a drive-mode of resonator 204. Comparator 201 may be designed to produce a MSW substantially synchronized with motion along the sense-axis due to quadrature, and comparator 217 may be designed to produce a MSW substantially synchronized with drive-mode motion. Under an applied angular rate, as shown in FIG. 2E, the comparator outputs B1 and B2 become phase shifted which is detected by the phase detect circuit 218, according to an embodiment.

In another example, sensing-transducers 202 and 216 are aligned with a pair of anti-parallel sense axes of resonator 204 and partially aligned to sense a common component drive-mode motion. Under no applied angular rate, the comparator outputs B1 and B2 are nominally in phase, as depicted in the second column of FIG. 2E. Under applied angular rate, comparator outputs B1 and B2 become phase shifted in opposite directions, and the phase shift is proportional to the applied angular rate, as depicted in the third column of FIG. 2E, according to an embodiment.

One advantage of using a comparator in the front end circuitry is that, for most of the full duty cycle, the output of the comparator maintains a constant value (either high (Vdd) or low (Vss)). Furthermore, for many resonators, the input signal received by the comparator has a very stable and well-defined frequency. This allows for duty-cycling the operation of the comparator.

Figure 3A:
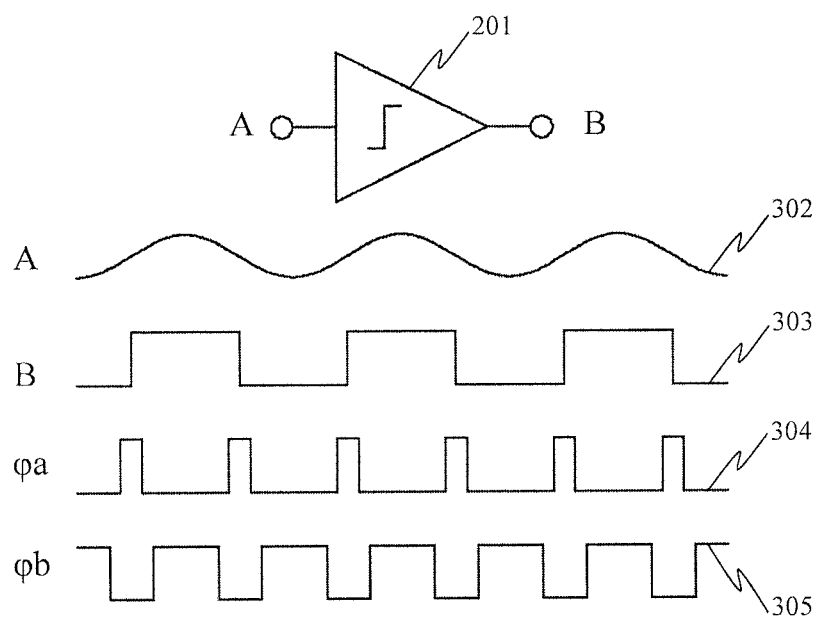
FIG. 3A illustrates duty-cycled operation of a comparator, according to an embodiment.

FIG. 3A illustrates an example input signal 302 and produced output signal 303 of comparator 201, according to an embodiment. A first phase signal ($\varphi a$) 304 may be defined around expected zero-crossings and a second phase signal ($\varphi b$) 305 may be defined during the portion of the duty-cycle when output signal 303 is expected to remain constant. While second phase signal 305 is a logic HIGH, other operations are possible such as, for example, powering off the comparator and associated circuitry to reduce power consumption or multiplexing detection with any necessary actuation of motion with the application of a force-feedback signal. The latter case is attractive in that a sense-transducer and a feedback actuator can be combined into a single component, thus reducing complexity and saving valuable space on the resonator.

Figure 3B:
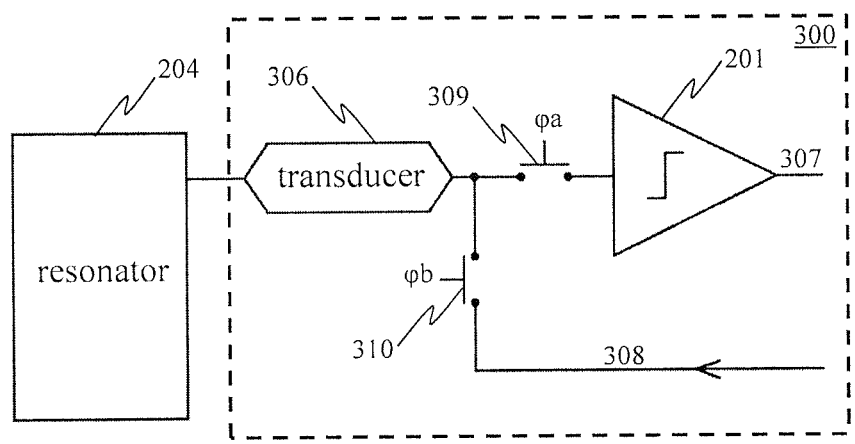
FIG. 3B illustrates a gyroscope measurement and control scheme using a duty-cycled comparator, according to an embodiment.

FIG. 3B illustrates resonator 204 coupled with another circuit 300, according to an embodiment. Circuit 300 includes a first switch 309 and a second switch 310 for controlling the duty cycle operation of comparator 201. Note that the reference signal for comparator 201 is not shown in this figure. First switch 309 may be controlled by first phase signal 304 while second switch 310 is controlled by second phase signal 305. Each switch may be considered closed while its corresponding control signal is a logic HIGH voltage, and open while its corresponding control signal is a logic LOW voltage. First phase signal 304 and second phase signal 305 may be triggered by a drive-synchronized signal (as described above), delayed by a desired amount.

Circuit 300 also includes a transducer 306, which acts as both sensor and actuator, according to an embodiment. Transducer 306 may be capable of transducing mechanical energy to electrical energy and electrical energy to mechanical energy, such that it acts as both a sensor aligned along an axis of resonator 204, and as an actuator for exciting one or more modes of resonator 204. According to an embodiment, the operation of switches 309 and 310 determines the operation state of transducer 306. For example, when first switch 309 is closed and second switch 310 is open, transducer 306 acts as a sensing transducer providing an electrical signal to comparator 201. When first switch 309 is open and second switch 310 is closed, transducer 306 acts as an actuator and receives a control signal 308 that determines a level of mechanical energy for transducer 306 to impart on resonator 204. Control signal 308 may be a feedback signal from another circuit coupled to circuit 300. Comparator 201 produces an output signal 307.

One potential issue with using a comparator is its behavior in the presence of a noisy input signal. More specifically, at the instant when an ideal input would produce a single transition, the presence of noise on the input could result in multiple erroneous transitions. This is known as chattering and it may be overcome by introducing threshold hysteresis in the comparator design.

Figure 4A:
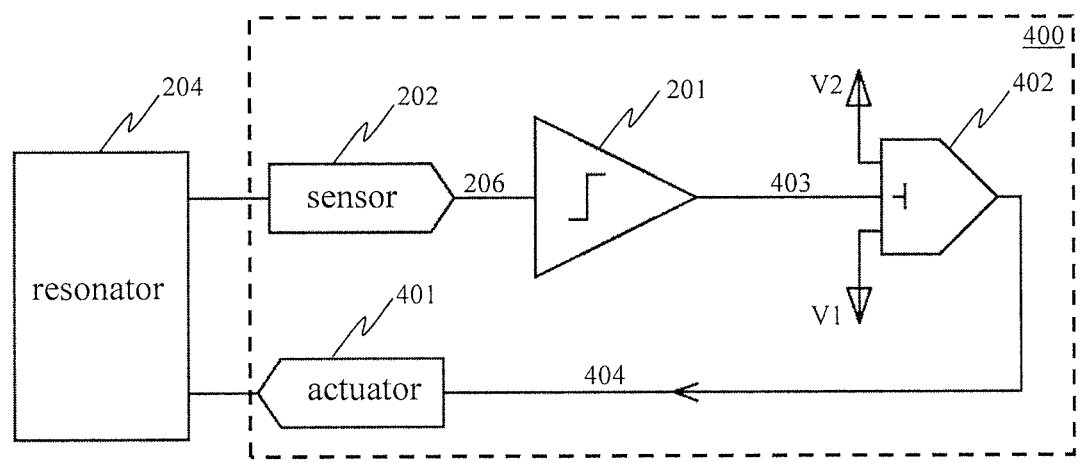
FIGS. 4A-4C illustrate gyroscope control schemes with feedback, according to some embodiments.

FIG. 4A illustrates resonator 204 coupled with another circuit 400, according to an embodiment. Circuit 400 provides positive-feedback drive-mode excitation utilizing comparator 201 (shown as, but not necessarily, single-ended), transducer 202 aligned with a drive-mode of resonator 204, an actuator 401 aligned with the drive-mode, and a driver module 402. In one embodiment, driver module 402 produces a fixed-amplitude driving signal 406 by toggling between a lower voltage (V1) and an upper voltage (V2), triggered by an output signal 403 from comparator 201. The resulting drive signal 404 may be applied to actuator 401, producing an applied force synchronized to the drive-mode motion. Depending on whether the motion is displacement or velocity, care must be taken in the design and choice of transducer 202 and actuator 401 to achieve the correct phase and polarity of the applied force to drive resonator 204 at resonance. For example, the correct phasing may be achieved if output signal 403 is produced by a capacitive, velocity-to-current transducer that feeds a current-mode comparator. The resulting drive-synchronization is the correct phase to drive at resonance when applied to a capacitive, voltage-to-force actuator, as long as the polarity is correct to produce positive rather than negative feedback. Furthermore, additional processing may be applied to drive signal 404 such as filtering, gain, and/or delay as required by the dynamics and other characteristics of the intended application.

Figure 4B:
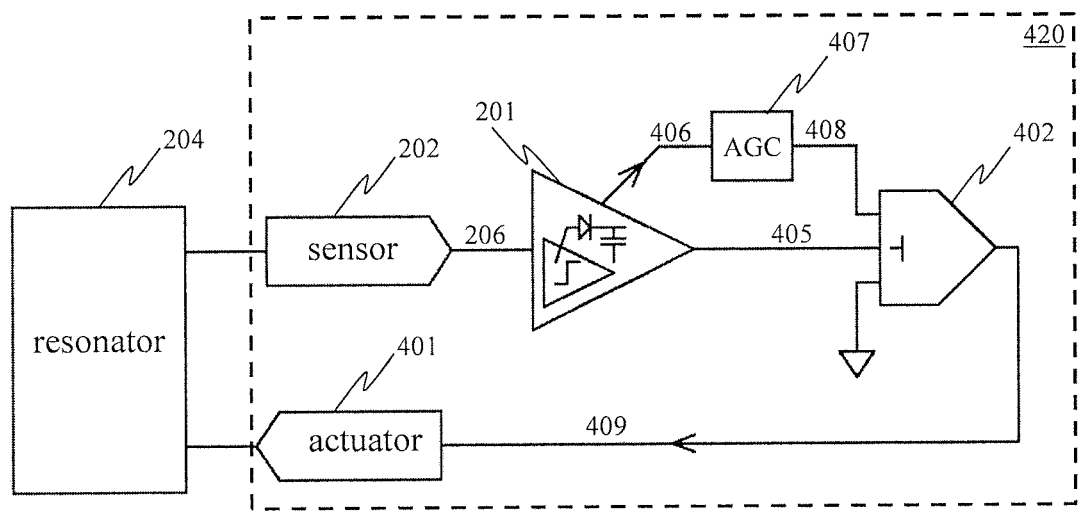

Although the phase-based approach requires no amplitude information in the critical data path, some auxiliary functionality or control may require amplitude measurements. Usually, such measurements need only to be made for small deviations about a nominal operating point. Therefore, linearity over a wide range is not required. FIG. 4B illustrates resonator 204 coupled with another circuit 420 that also utilizes amplitude measurements, according to an embodiment. Peak amplitude detection may be implemented using signals already present (or easily derived) from within comparator 201, according to an embodiment. For example, a full-wave rectifier can be fed by mirrored and/or steered currents internal to comparator 201. The result may then be low-pass-filtered to provide a signal 406 proportional to the amplitude of the comparator input signal 206.

According to an embodiment, circuit 420 includes an automatic gain control (AGC) loop for drive-mode excitation. An output of transducer 202 aligned with the drive-mode of resonator 204 is fed to the input of comparator 201 (shown as, but not necessarily, single-ended). Comparator 201 produces an output signal 405 and amplitude signal 406. Amplitude signal 406 is compared against a target value within an AGC circuit 407 to produce an AGC output 408 that defines the amplitude of a driving signal 409.

The operation of comparator 201 along with driver module 402 may be duty-cycled such as shown by circuit 300 in FIG. 3B.

Figure 4C:
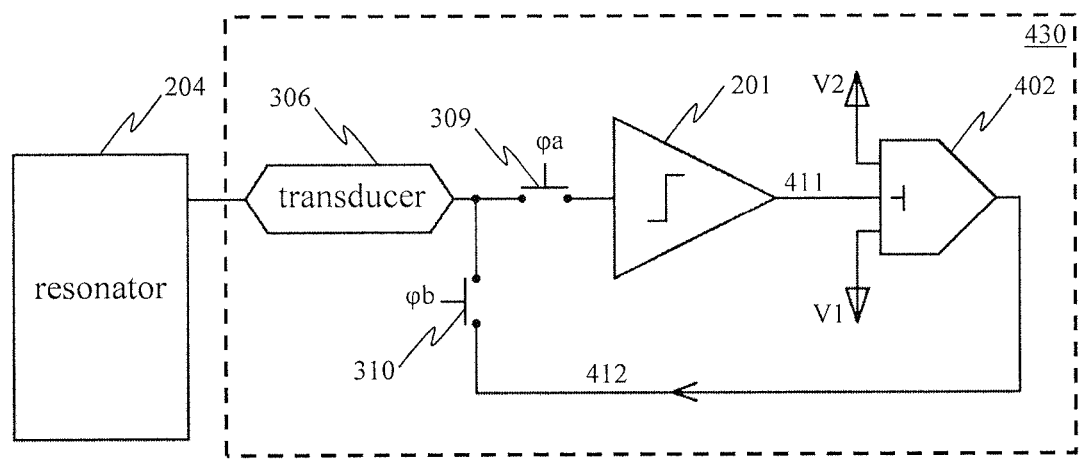

FIG. 4C illustrates resonator 204 coupled with another circuit 430 that includes duty-cycled operation of comparator 201 and driver module 402, according to an embodiment. First switch 309 and second switch 310 may operate in a similar fashion as described above with reference to FIGS. 3A and 3B. Output signal 411 from comparator 201 is fed to driver module 402. Driver module 402 produces a feedback control signal 412 that excites an actuator of resonator 204 when second switch 310 is closed.

Performance may be greatly increased by operating the system in a closed loop fashion similar to a phase-locked-loop (PLL). In this configuration, for each sense axis, feedback signals are applied to sense axis actuators to counteract phase shifts that occur in response to angular rate. Monitoring the magnitude of the feedback required to maintain a constant phase provides an indication of the externally applied angular rate. This phase-based closed-loop operation has the advantage over traditional force-rebalance closed-loop operation in that the feedback signal only affects the signal due to rate, while other signals present, such as quadrature, are unaffected. Thus, the phase-based closed-loop operation avoids complex synchronous demodulation and/or quadrature nulling schemes and may be implemented with relatively simple circuitry.

The signal-to-noise (S/N) of a gyroscope may be greatly increased by operating at small frequency separations between the drive and sense modes. One method of achieving this is with the phase-based closed-loop implementation discussed above. By analogy, this is similar to a PLL circuit, where a MEMS resonator takes the place of the VCO and also produces the reference signal(s) used for synchronization. In the case of a phase-based closed-loop gyroscope, phase shifts produced by externally applied angular rate are counteracted through feedback applied to the resonator. The magnitude of feedback required to counteract the phase shifts may be used to determine the applied rate. Traditional closed-loop gyroscopes use a force-rebalance approach where feedback is applied to completely null sensed motion. This method requires additional functionality to distinguish between signals due to rate and unwanted signals such as quadrature. By contrast, the phase-based closed-loop approach only nulls signals due to rate, intrinsically separating signals due to rate from unwanted signals such as quadrature.

Figure 5A:
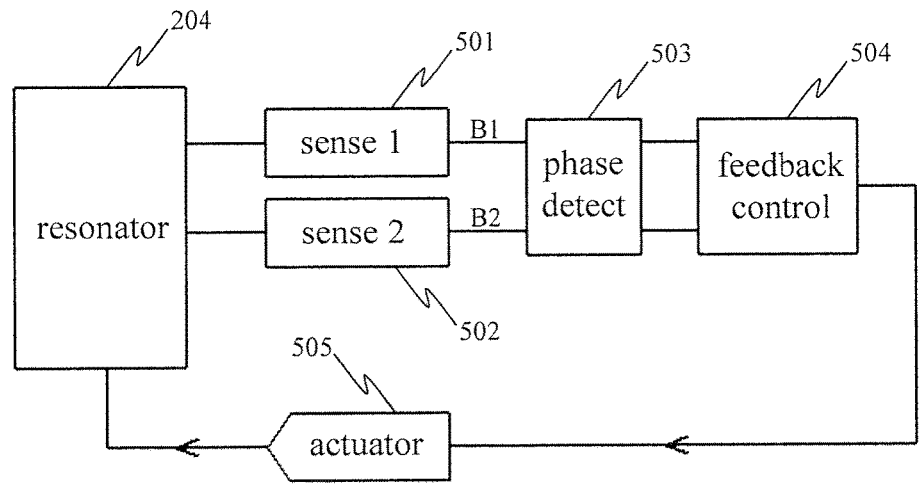
FIGS. 5A and 5B illustrate diagrams of phase-based closed-loop gyroscopes, according to some embodiments.

FIG. 5A illustrates a basic phase-based closed-loop gyroscope, according to an embodiment. In this example, a sensing-module 501 is aligned to a sensing-axis of resonator 204, and a sensing-module 502 is aligned to another (e.g., non-collinear) axis of resonator 204 such that an externally applied angular rate produces a phase shift between the signals B1 and B2, the outputs of the two sensing-modules. As depicted in FIG. 5C, the signals B1 and B2 are mixed-signal waveforms (MSWs), according to an embodiment. A phase detect circuit 503 measures the phase shifts between signals B1 and B2, and a feedback control circuit 504 produces a feedback signal in proportion to the measured phase shifts. An actuator 505 receives the feedback signal and mechanically affects the resonator such that the phase shifts are counteracted, according to an embodiment. In one example, the actuator produces an oscillatory mechanical force to counteract the phase shifts due to rate. In another example, the actuator produces an electrostatic damping to counteract the phase shifts due to rate. In another example, the actuator produces an electrostatic stiffness to counteract the phase shifts due to rate.

In an embodiment, sensing-module 501 is nominally aligned with a sensing-axis of resonator 204 and sensing-module 502 is nominally aligned with the drive-mode of the resonator. Under no applied angular rate, the quadrature of the sensing-axis and the response due to motion of the drive-mode have a constant (or zero) phase shift. Under applied angular rate, the output of sensing-module 501 becomes phase shifted with respect to that of sensing-module 502, and the phase shift is proportional to the externally applied angular rate.

In an embodiment, sensing-modules 501 and 502 are nominally aligned with anti-parallel sensing-axes of the resonator. Additionally, the sensing-modules are partially aligned to a common-mode axis such that the common-mode responses are nominally in-phase and have similar magnitudes. In one example, the sensing-modules are partially aligned with the drive mode, which produces the common-mode signal. In another example, the sensing-modules are partially aligned with an auxiliary mode of the resonator, which produces the common-mode signal. Under no applied angular rate, the outputs B1 and B2 of the sensing-modules have a constant (or zero) phase shift. Under applied angular rate, the outputs B1 and B2 become phase shifted with respect to each other, and the phase shift is proportional to the externally applied angular rate.

Figure 5B:
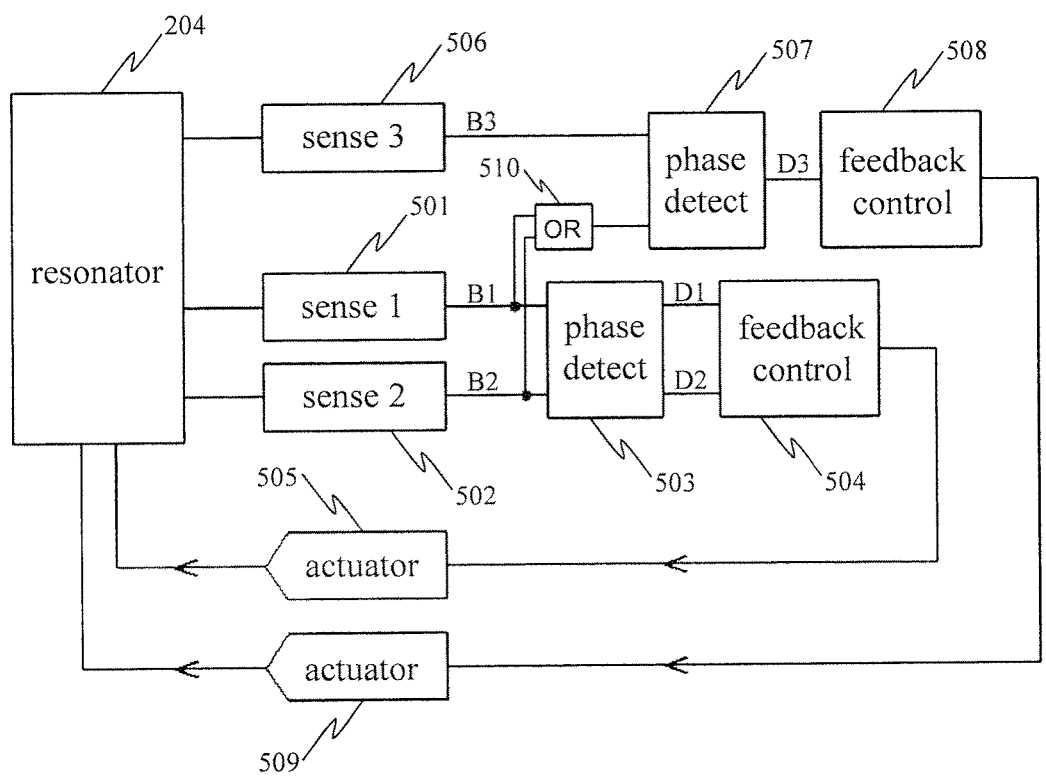

FIG. 5B illustrates a phase-based closed-loop configuration where a secondary control loop maintains a fixed frequency separation between the drive and sense modes, according to an embodiment. In this example, sensing-modules 501 and 502 are aligned to anti-parallel sense axes, phase detect circuitry 503 produces PWM signals D1 and D2 in response to phase shifts, and feedback control circuitry 504 produces a feedback signal received by actuator 505 to counteract the phase shifts. Additionally, a third sensing-module 506 may be aligned to the drive-mode and a second phase detect circuit 507 detects phase shifts between the drive-synchronized signal B3 and the logical union of the outputs of the two sense-mode sensing-modules 501 and 502, according to an embodiment. The output D3 of the second phase detect circuit 507 may be another PWM signal whose average value is proportional to the phase offset between the motion of the drive and sense-modes. Feedback control circuitry 508 receives the phase detect output D3 and produces a feedback signal received by a second actuator 509. In an embodiment, actuator 509 maintains a fixed frequency separation between the drive and sense modes by modulating an electrostatic stiffness applied to the sense-mode of resonator 204. In another embodiment, actuator 509 maintains a fixed frequency separation between the drive and sense modes by producing an oscillatory force onto the sense-mode of resonator 204.

Various sensing-transducer technologies are amenable to implementation in a micro-gyro, including capacitive, piezoelectric, piezoresistive, transistor-based, or some other technology that produces an electrical signal (current or voltage) proportional to the oscillatory motion (displacement or velocity). The input domain (displacement or velocity) has consequences on the phase of the output. Thus, the choice of transducer should be made to achieve the correct phase for the intended application. The output domain (current or voltage) has implications as to the class of circuit used. Similarly, various actuator technologies are available as well, such as capacitive or piezoelectric, and have implications on the correct phasing of resonator excitation.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A gyroscope comprising:
   a mechanical resonator;
   a first transducer;
   a comparator configured to:
      receive an input signal from the transducer, and
      compare the input signal with a reference signal to produce an output signal, wherein rising and falling edge transitions of the output signal are substantially synchronized with a motion of the mechanical resonator along a sense-axis of the transducer, and wherein the comparator is powered off during a period of time between subsequent rising and falling edge transitions; and
   a first switch configured to open or close an electrical pathway between the transducer and an input of the comparator.

2. The gyroscope of claim 1, wherein the output signal is a mixed signal waveform (MSW).

3. The gyroscope of claim 1, wherein the sense-axis of the first transducer is aligned with a drive mode of the mechanical resonator.

4. The gyroscope of claim 1, wherein the sense-axis of the first transducer is aligned with a sense mode of the mechanical resonator.

5. The gyroscope of claim 1, wherein the reference signal includes at least one common-mode error shared with the input signal.

6. The gyroscope of claim 5, wherein the common-mode error is a voltage supply noise.

7. The gyroscope of claim 5, wherein the common-mode error is caused by a temperature variation.

8. The gyroscope of claim 1, wherein the comparator receives the reference signal from a reference source external to the comparator.

9. The gyroscope of claim 1, wherein the comparator receives the reference signal from a reference source within the comparator.

10. The gyroscope of claim 1, further comprising:
    a second switch configured to open or close an electrical pathway between an actuator of the gyroscope and an external signal source.

11. The gyroscope of claim 10, wherein the first switch is controlled via a first control signal such that the first switch is closed during the rising and falling edge transitions of the output signal, and the first switch is open during a period of time when the output signal has a substantially constant voltage.

12. The gyroscope of claim 10, wherein the second switch is controlled via a second control signal such that the second switch is open during the rising and falling edge transitions of the output signal, and the second switch is closed during a period of time when the output signal has a substantially constant voltage.

13. The gyroscope of claim 12, wherein the external signal source produces a signal configured to cause motion of the mechanical resonator via the actuator when the second switch is closed.

14. The gyroscope of claim 1, wherein the reference signal is received from a second transducer of the gyroscope at a second input of the comparator.

15. The gyroscope of claim 14, wherein the first transducer and the second transducer are configured to sense motion about nominally anti-parallel sense axes.

16. The gyroscope of claim 1, wherein the output signal is a first output signal, and the gyroscope further comprises:
    a second transducer; and
    a second comparator configured to:
        receive a second input signal from the second transducer,
        compare the second input signal with a second reference signal to produce a second output signal,
        wherein rising and falling edge transitions of the second output signal are substantially synchronized with a motion of the mechanical resonator along a sense-axis of the second transducer, and
        wherein a phase shift between the first output signal and the second output signal is proportional to an externally applied angular rate.

17. The gyroscope of claim 16, further comprising a phase detect module configured to receive the first output signal and the second output signal and to produce one or more additional output signals having pulse widths that are proportional to the phase shift between the first output signal and the second output signal.

18. The gyroscope of claim 17, further comprising a signal processing module configured to:
    receive the one or more additional output signals;
    perform signal processing functions on the received one or more additional output signals; and
    produce a processed output signal proportional to the externally applied angular rate.

19. The gyroscope of claim 17, wherein the one or more additional output signals comprise complementary output signals, wherein pulse widths of a first complementary output signal are proportional to the phase of the first output signal with respect to the phase of the second output signal, and pulse widths of a second complementary output signal are proportional to the phase of the second output signal with respect to the phase of the first output signal.

20. The gyroscope of claim 16, where the first transducer is aligned with a sense-axis of the mechanical resonator and the second transducer is aligned with a drive-mode of the mechanical resonator.

21. The gyroscope of claim 16, where the first and second transducers are configured to sense motion about nominally anti-parallel sense axes, and to sense common-mode motion.

22. The gyroscope of claim 21, where the common-mode motion is a drive-mode motion.

23. The gyroscope of claim 21, where the common-mode motion is the motion of an auxiliary resonator mode.

24. A gyroscope comprising:
    a mechanical resonator;
    an actuator;
    a transducer;
    a comparator configured to:
        receive an input signal from the transducer, and
        compare the input signal with a reference signal to produce an output signal, wherein rising and falling edge transitions of the output signal are substantially synchronized with a motion of the mechanical resonator along a sense-axis of the transducer, and wherein the comparator is powered off during a period of time between subsequent rising and falling edge transitions;
    a driver module configured to receive the output signal and produce a driving signal that is applied to the actuator; and
    a first switch configured to open or close an electrical pathway between the transducer and an input of the comparator.

25. The gyroscope of claim 24, wherein the driver module is configured to produce a driving signal that toggles between a first voltage and a second voltage.

26. The gyroscope of claim 24, further comprising a gain control module configured to:
    receive a peak-amplitude signal from the comparator,
    compare the peak-amplitude signal with a target value, and
    produce a driving amplitude signal received by the driver module and configured to control an amplitude of the driving signal.

27. The gyroscope of claim 24, further comprising:
    a second switch configured to open or close an electrical pathway between the actuator and the driver module.

28. A gyroscope comprising:
    a mechanical resonator;
    a first transducer and a second transducer, the first transducer being aligned to a first axis of the resonator and the second transducer being aligned to a second axis of the mechanical resonator;
    a phase detect circuit configured to detect a phase shift between an output of the first transducer and an output of the second transducer, wherein the phase shift is proportional to an externally applied angular rate;
    a feedback control circuit configured to produce a feedback signal based on the detected phase shift, wherein the feedback signal counteracts the detected phase shift by suppressing motion of the mechanical resonator; and
    a first actuator configured to receive the feedback signal and counteract the phase shift by producing an oscillatory force onto the mechanical resonator.

29. The gyroscope of claim 28, wherein the output of the first transducer is a first electrical signal, substantially synchronized with motion along the first axis of the mechanical resonator, and the output of the second transducer is a second electrical signal, substantially synchronized with motion along the second axis of the mechanical resonator.

30. The gyroscope of claim 29, where the first axis is nominally aligned with a sense-axis of the mechanical resonator, and the second axis is nominally aligned with a drive-mode of the mechanical resonator.

31. The gyroscope of claim 29, where the first and second axes are primarily aligned to anti-parallel sense axes and partially aligned to a common-mode axis of the mechanical resonator.

32. The gyroscope of claim 31, where the common-mode axis is a drive-mode of the mechanical resonator.

33. The gyroscope of claim 31, where the common-mode axis is an auxiliary mode of the mechanical resonator.

34. The gyroscope of claim 28, wherein the actuator is configured to counteract the phase shift by producing an electrostatic damping onto the mechanical resonator.

35. The gyroscope of claim 28, wherein the actuator is configured to counteract the phase shift by producing an electrostatic stiffness onto the mechanical resonator.

36. The gyroscope of claim 28, further comprising:
- a third transducer aligned with a drive mode of the mechanical resonator;
- a second phase detect circuit configured to detect a second phase shift based on the outputs of the first and second transducers, and an output of the third transducer; and
- a second feedback control circuit configured to produce a second feedback signal based on the detected second phase shift, wherein the second feedback signal maintains a substantially constant frequency separation between the drive-mode and a sense-mode of the mechanical resonator.

37. The gyroscope of claim 36, wherein the second feedback signal also maintains a constant phase shift between the drive-mode and the sense-mode.

38. The gyroscope of claim 36, further comprising a second actuator configured to receive the second feedback signal.

39. The gyroscope of claim 38, wherein the second actuator is configured to produce an oscillatory force onto the mechanical resonator, based on the second feedback signal.

40. The gyroscope of claim 38, wherein the second actuator is configured to produce an electrostatic stiffness onto the mechanical resonator, based on the second feedback signal.

\* \* \* \* \*